United States Patent

[11] 3,632,870

| | | |
|---|---|---|
| [72] | Inventor | Harold Bruce Henderson<br>Carrollton, Tex. |
| [21] | Appl. No. | 518,480 |
| [22] | Filed | Jan. 3, 1966 |
| [45] | Patented | Jan. 4, 1972 |
| [73] | Assignee | Texas Instruments Incorporated<br>13500 N. Central Expressway, Dallas 31, Tex. |

[54] SCANNER SYSTEM
7 Claims, 5 Drawing Figs.

[52] U.S. Cl................................................ 178/7.6, 178/6.7
[51] Int. Cl.................................................. H04n 3/00
[50] Field of Search......................................... 178/6.7, 6.6, 6.5, 6, 6.8, 26; 350/181, 271; 88/24, 1

[56] References Cited
UNITED STATES PATENTS
2,945,414  7/1960  Blackstone.................. 178/6.7

*Primary Examiner*—Rodney D. Bennett, Jr.
*Assistant Examiner*—Joseph G. Baxter
*Attorneys*—Samuel M. Mims, Jr., James O. Dixon, Andrew M. Hassell, Harold Levine, John E. Vandigriff and Rene E. Grossman ABSTRACT: A method and apparatus for eliminating multiple images in an airborne optical scanner which occur because of the widening of the scan path as the scanning beam moves from directly underneath the aircraft toward the horizon on either side of the aircraft, and which causes blurring or loss of resolution for the images falling within two or more scans. The problem is overcome by placing selected apertures in the paths of beams of light modulated by information from associated scanners, so as to restrict to a minimum overlap the paths traced by such beams of light on a photographic recording medium.

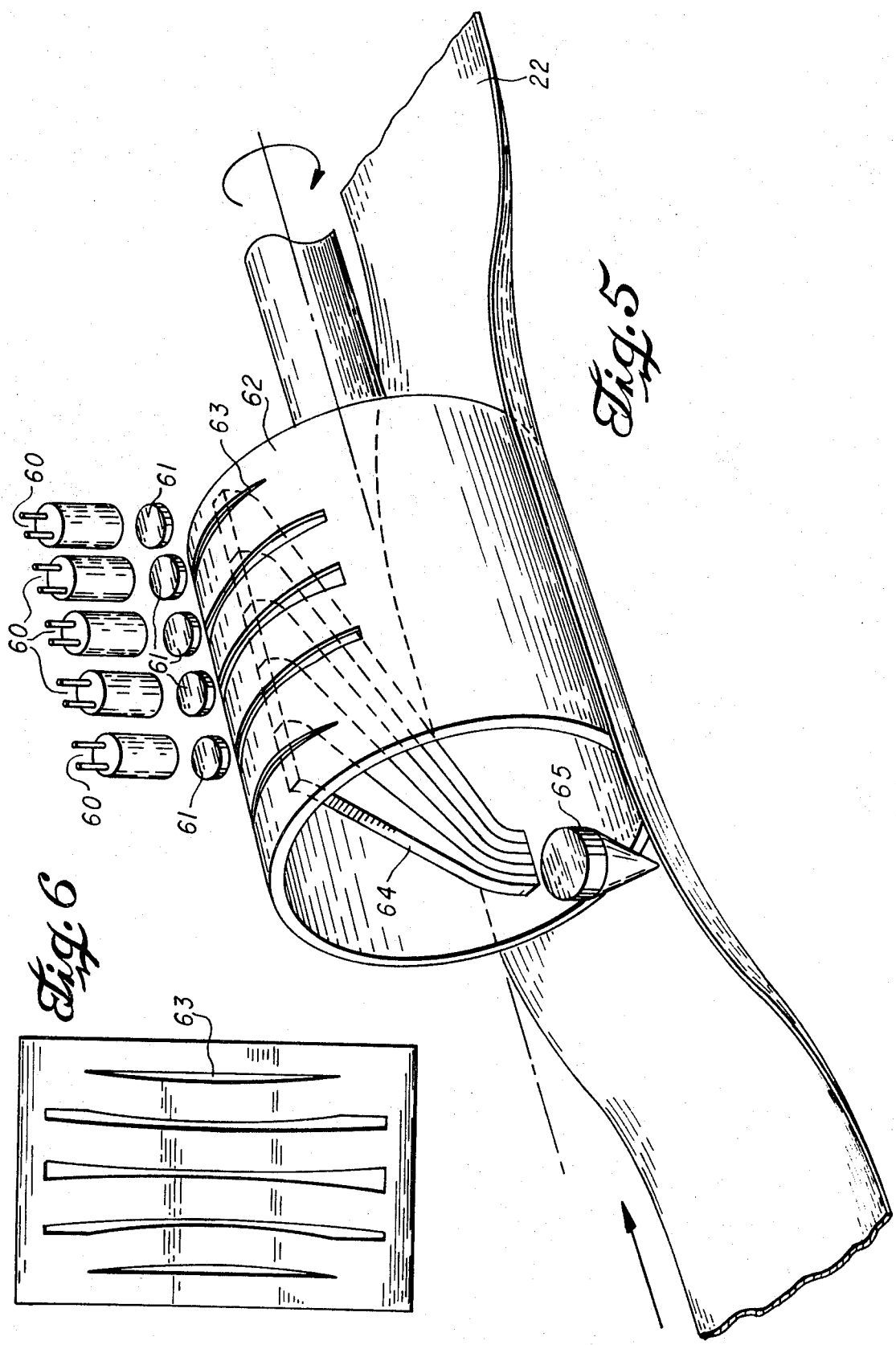

SCANNER SYSTEM

This invention relates to an optical scanner and more particularly to such a scanner having a compensation for the fixed-axis resolution effect.

As an airborne optical scanner, for example an infrared reconnaissance system, having constant angular resolution scans the ground beneath the aircraft in a direction perpendicular to the flight path, the terrain encompassed by the scan grows as the scan moves toward the horizon. This is the fixed-axis resolution (FAR) effect. With both single and multiple detector reconnaissance systems, the FAR effect can cause the system to produce multiple display images of one target.

It is an object of the invention to compensate for the effect of fixed axis resolution.

It is another object of the invention to provide an apparatus and method for eliminating multiple display images of one target due to the fixed axis resolution effect in a multiple detector scanner.

Still another object of the invention is to provide an apparatus for accurately displaying the images of targets detected by a multiple sensor infrared reconnaissance system.

In accordance with the invention, the targets sensed by the reconnaissance system along a terrain path of variable width are displayed along a display path in the shape of the terrain path, thereby eliminating multiple display images of the same target.

In a further aspect of the invention, there is provided an apparatus for displaying with FAR effect compensation, images of targets detected by a multiple sensor infrared reconnaissance system.

Other objects, features and advantages of the invention will be more readily understood from the following detailed description when read in conjunction with the appended claims and attached drawing, in which:

FIG. 5 shows an apparatus for providing FAR effect compensation according to the invention; and FIG. 6 illustrates a compensation mask for use with the apparatus of FIG. 5.

Figure 1:
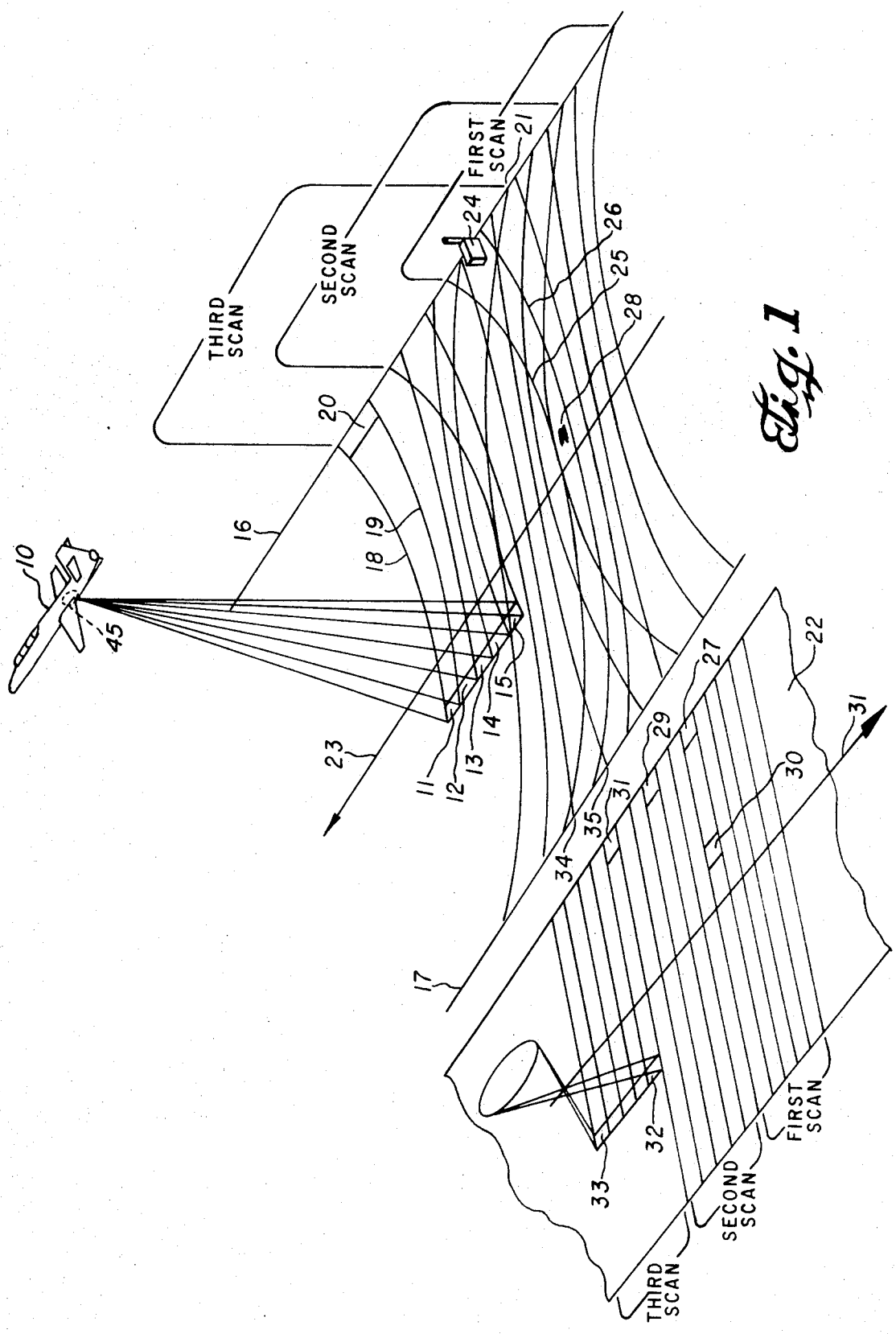
FIG. 1 illustrates the operation of a multiple detector infrared scanning system without the compensation provided by the invention.

FIG. 1 illustrates the problem solved by the invention. Airplane 10 has several detectors 45 located therein for detecting infrared radiation emanating from the terrain below the aircraft. There are five such detectors in the case illustrated, the detectors being arranged generally side by side in a line. A single-optical system casts an image of the terrain on the array of five detectors. Detectors and a scanning system suitable for such a reconnaissance system are found in the single detector RS-7 Infrared Reconnaissance System, manufactured by Texas Instruments Incorporated, Dallas, Texas. The scanning and detecting system may be of the type illustrated for one of the detectors shown in U.S. Pat. No. 3,069,493 issued Dec. 18, 1962 to Bob Martel, with plural detectors and the field stops required for each detector replacing said one detector. At the instant shown in FIG. 1, the first infrared detector (or sensor) is responsive to radiation from a plot of terrain 11. The second sensor detects radiation from plot 12, and the third, fourth, and fifth sensors are responsive to plots 13, 14 and 15, respectively. At other times during the operation of the detectors, the five plots scanned by the individual detectors do not change in their general relationship to each other, but the optical system associated with the detectors causes the array of detectors to scan the terrain from line 16 to line 17. The sector observed by the array repeatedly sweeps from line 16 to line 17 along a path perpendicular to the line of flight, each new scan beginning again at line 16.

Each of the detectors in the scanning array described has a fixed resolution. For example, each may have a resolution of 1.0 milliradian. That is, each detector can distinguish two radiating objects as separate objects if they are separated by as much as 1.0 milliradian. Accordingly, each detector is arranged with field stops so that it receives radiation only from the area encompassed by an angle of approximately 1.0×1.0 milliradian. The problem solved by the invention arises from the fact that such a fixed angle encompasses a much larger plot of terrain at large scan angles, i.e., near lines 16 and 17, than it does beneath the plane. Lines 18 and 19, representing the area scanned by the first detector from line 16 to plot 11, bound plot 20 which is the area encompassed by the same angle as that which encompasses plot 11. This increase of scan area corresponding to the increase of the scan angle from the vertical is called the fixed-axis resolution effect or FAR effect. The scan paths of the other detectors likewise being indicated by boundary lines similar to lines 18 and 19, it can be seen that the array as a whole observes a much larger area, bounded by lines 18 and 21, at line 16 than beneath the plane.

The particular terrain patterns shown in FIG. 1 represent the special case in which the aircraft flies at a speed such that each successive terrain scan pattern is tangential to the preceding scan pattern along the ground line 23 which represents the line of flight. The terrain scan patterns for each detector and for each of three successive scans are shown in FIG. 1, the outermost limit of the first, second, and third terrain scan patterns being indicated by brackets. Although it would be possible to allow a gap along line 23 between successive scan patterns, such a practice would leave a portion of the terrain unobserved. It would also be possible, and is often the case, that each successive scan pattern overlaps the preceding scan pattern somewhat.

The display problem resulting from the FAR effect can be appreciated from a consideration of the film record 22 of the detector outputs. On film record 22, the outputs of the five detectors are recorded on five parallel paths transverse to the direction of film movement. The record of each detector output is made by a light modulator responsive to the electrical output signal of one of the detectors. Thus, the output at film location 32 is from a modulator receiving an electrical signal from the detector which senses the infrared radiation at plot 15. Therefore, the brightness of the light projected on location 32 corresponds to the intensity of the infrared radiation detected at plot 15. The film record at spot 33 likewise corresponds to plot 11. The light from the five light modulators is moved across the film, exposing the film in accordance with the amount of infrared radiation detected by the individual detectors. The speed of scanning across the film in the direction transverse to its movement is in proportion to the speed of terrain scanning between lines 16 and 17. In the system of FIG. 1, the light from the light modulators is applied to film record 22 in such a manner that the film record for each detector has a constant width across the film, rather than exhibiting a "bow tie" appearance similar to the terrain scan patterns. The film is moved with respect to the modulators as indicated by the arrow 31. The speed of the film is controlled in accordance with the velocity and height of the aircraft, so that the successive scans of the modulators will be located with respect to each other in the same manner as the successive terrain scans. Each of the three sets of five parallel film records is seen to be adjacent the next preceding set for the particular set of terrain scans shown in FIG. 1.

On the first scan in FIG. 1, infrared radiating target 24 is detected by the first detector, which scans a sector bounded by lines 25 and 26. Hence, an image 27 appears on the film record 22 in a position corresponding to the output of the first detector on the first scan. A second target 28, nearer line 23, is detected and gives rise to image 30. On the second scan of the multiple detectors target 24 is detected by the third detector, scanning an area bounded by lines 34 and 35 and an image 29 appears on the film record in the trace corresponding to the third detector on the second scan. Target 28 is not detected by any of the detectors on the second scan; hence no image thereof appears in the film record of the second scan. Target 24 is detected by the fifth detector on the third scan, and appears as image 31 on the film record. Target 28 is not detected by any of the detectors on the third scan. Thus, while a target such as target 28 on the flight line 23 appears but once on the film record, target 24 at a large scan angle creates three images, images 27, 29 and 31. If the airplane 10 flies slower, so that a scan by the detector array overlaps the preceding scan, the film record 22 may contain even more images of target 24, by allowing said target to be detected one or more times by each of the five detectors, rather than merely by three of them as shown. It is apparent that the multiple images produced by the multiple detectors are seriously detrimental to target identification, even under the best reconnaissance condition, which is that using tangential successive scans as illustrated in FIG. 1.

Figure 2:
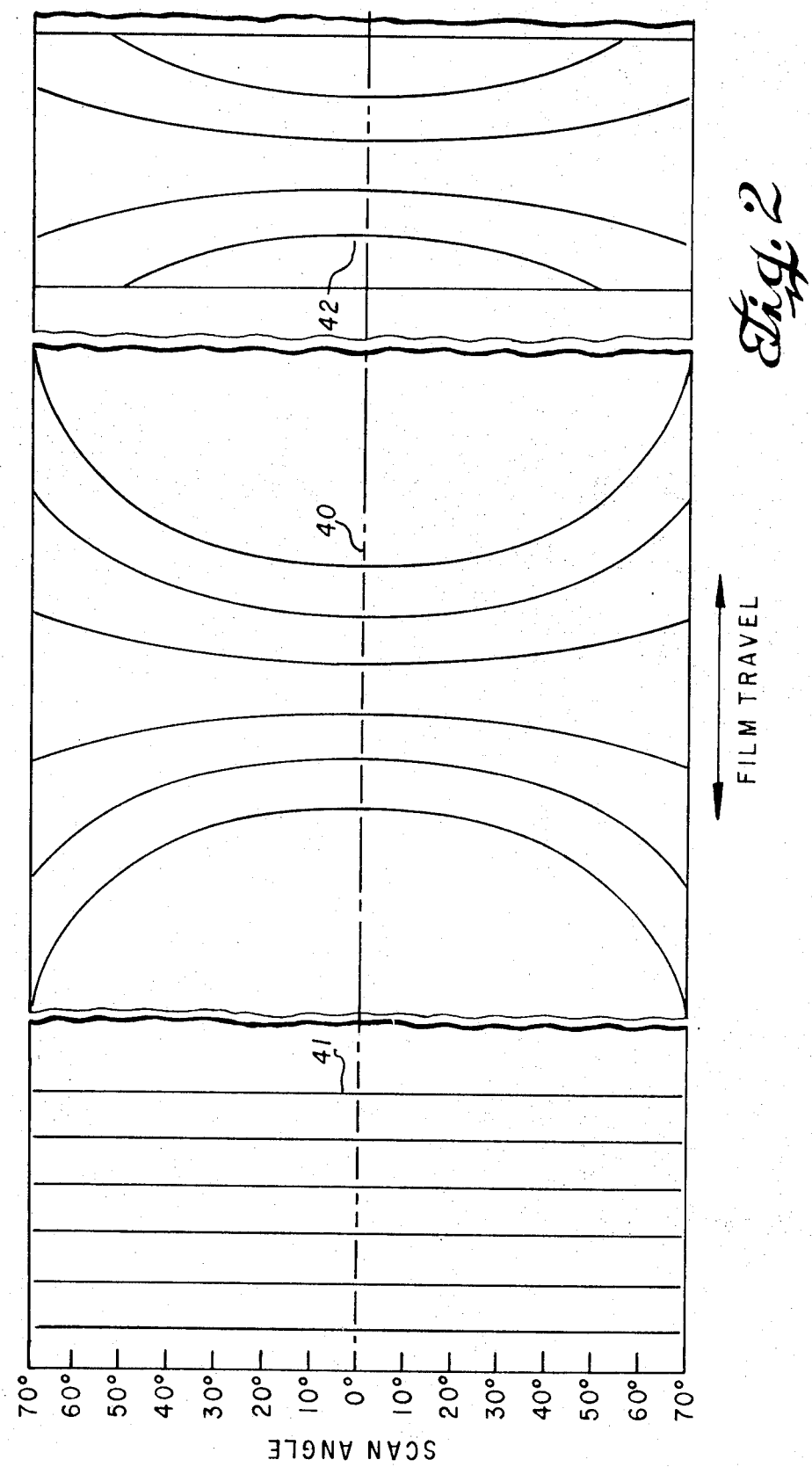
FIG. 2 illustrates possible display paths for use with a multiple detector system.

In accordance with the invention, one target is made to appear as but one film record image despite the detection of the target by multiple detectors. It has been conceived in accordance with the invention that the foregoing can be accomplished by causing the light modulators to expose the film record along paths having the same shape as the terrain sectors scanned on the ground. A first embodiment of the desired film record scan is illustrated in FIG. 2 by the group of traces 40. For comparison, there is also included in FIG. 2 a film record scan 41 of the type shown in FIG. 1, wherein the light from each modulator is traced straight across the film. The pattern of traces 40 causes each target detected to be placed on the film record in a position corresponding to its position on the ground. As a result of such placement, the map created by the film record is directly analogous to the pattern scanned on the ground, and when a single target is detected by plural detectors, the motion of the film causes the plural images to be printed out on top of each other as one image. Such operation is illustrated in detail in connection with FIG. 3. The third pattern of traces 42 in FIG. 2 illustrates a second embodiment of the invention. It is seen that the pattern 42 can be derived from the pattern 40 by restricting the film images to an area bounded by two straight, transverse lines tangential to the pattern 40 at the portion thereof corresponding to the flight path or zero scan angle. As will be described in connection with FIG. 3, the effect of pattern 42 is to limit the number of image superpositions resulting from one target, with a commensurate improvement in image clarity.

Figure 3:
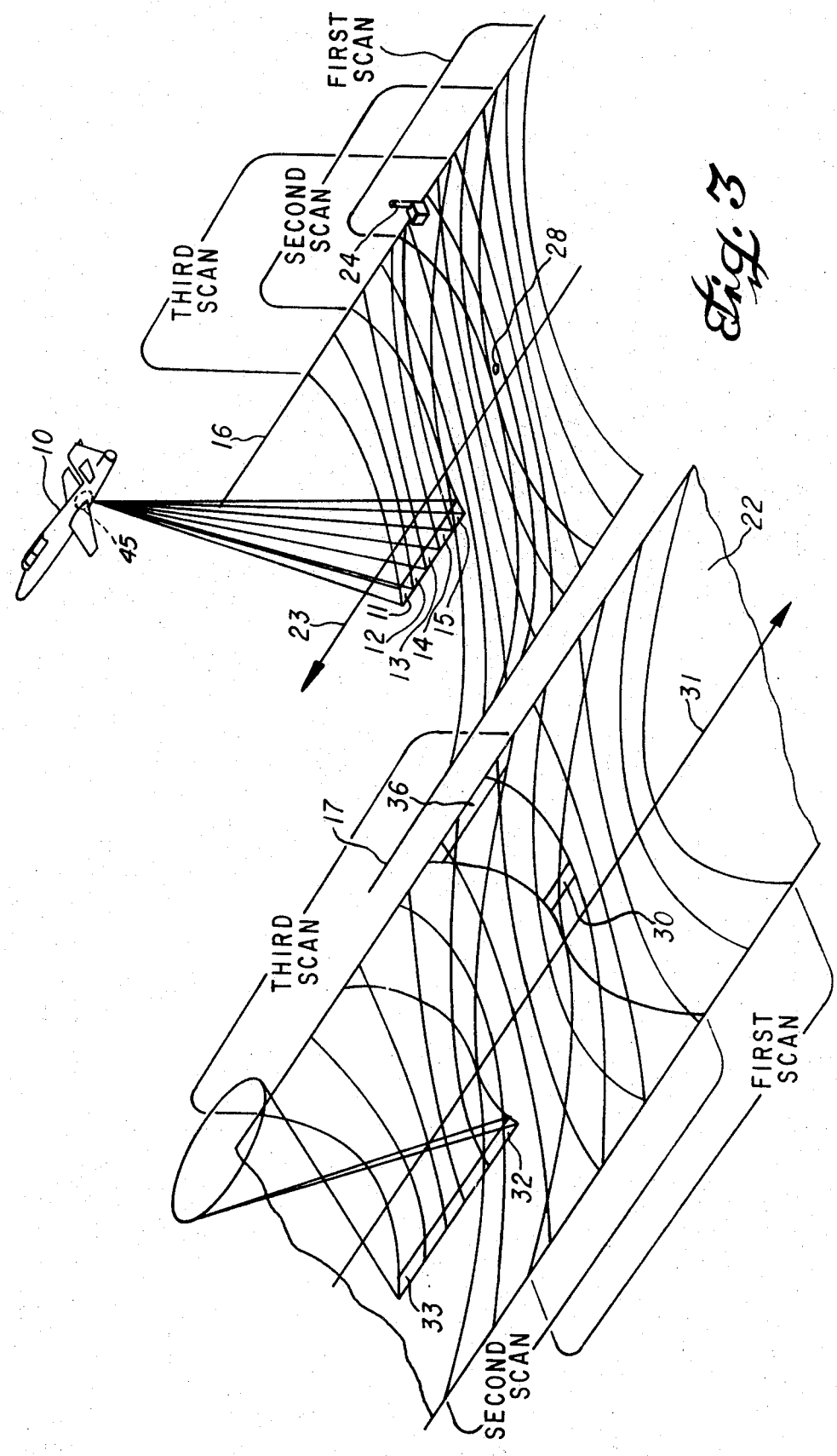
FIG. 3 illustrates the operation of a multiple detector infrared scanning system in accordance with one embodiment of the invention.

FIG. 3 illustrates the film record obtained by using trace pattern 40 of FIG. 2 in conjunction with the terrain scan pattern of FIG. 1. An apparatus suitable for producing the curved patterns 40 and 42 is discussed below in connection with FIGS. 5 and 6. The terrain and infrared detection system of FIG. 3 are the same as shown in FIG. 1 except that the outputs of the light modulators are applied to the film 22 of FIG. 3 along paths in the shape of pattern 40 in FIG. 2, rather than pattern 41 thereof, as used in the display of FIG. 1. Thus, the display image produced at locations 32 and 33 in FIG. 3 correspond to terrain plots 15 and 11, respectively. The three groups of five display paths corresponding to the first, second and third scans in FIG. 3 are indicated in the figure by brackets.

For the display illustrated in FIG. 3, on the first scan, both targets 24 and 28 are detected by the first detector. Images of the two targets are correspondingly printed on film 22 as images 36 and 30, respectively. On the second scan, target 28 is not detected by any of the detectors, hence, there is no image printed corresponding to that target. Target 24 is detected by the third detector in the second scan, and an image is produced in the display path corresponding to the third detector. The position on the film of the image printed in response to the detection of target 24 by the third detector is the same position as previously printed image 36. The two image locations coincide because the film 22 has moved with respect to the light modulators sufficiently that a portion of the display path corresponding to the third detector for the second scan overlaps the display path corresponding to the first detector for the first scan. The speed of the film 22 with respect to the light modulator, as in the display of FIG. 1, is in such proportion to the velocity of the aircraft 10 that the successive scans of the light modulators across the film 22 overlap or are adjacent to each other along the moving dimension of the film to the same degree that the successive scans of the infrared detectors overlap each other on the terrain. Thus, in FIG. 3 it is seen that the first and second scans of the light modulators across film 22 form an overlapping pattern identical to that of the first and second infrared detector scans across the terrain. It is the overlapping of the terrain scans which gives rise to multiple detections of one target. When the target images are produced in an image pattern directly corresponding to the terrain scan patterns, the multiple detections result in only one image. Multiple images result from the multiple detections only when there are employed display paths such as those in FIG. 1, which do not locate the image in a film position corresponding to the terrain position of the target.

On the third scan, in the display of FIG. 3, the fifth detector senses target 24, and the corresponding light modulator prints an image of the target in the display path corresponding to the fifth detector. Again, the movement of film 22 in relation to the light modulators causes the image of target 24 to be printed on film 22 in the same position as image 36. Thus, detection of target 24 on each of three successive scans result in but one display image 36. It is seen from FIG. 3 that the size of image 36 after multiple detections of target 24 may be somewhat larger than the size of the image produced by any one of the light modulators, in response to one of the detections. This effect results from the fact that the image produced by a given target can vary, depending on which of the detectors senses the target, and hence on which display path the target is printed. Moreover, it is seen in FIG. 3 that the images printed by a light modulator near the edge of the film are large in comparison to those printed near the center of the film and large in comparison to the images obtainable with the display of FIG. 1. Therefore, when it is said that the targets in the display of FIG. 3 are placed in a film position corresponding to the terrain position of the target, it must be understood that the accuracy of such placement is limited by the size of the images corresponding to targets nearer the edge of the film. The source of the large images near the edge of the film, is of course, the large terrain plot encompassed by the detectors at the large scan angles. The display is merely producing images with the same accuracy as the detectors are sensing them. Thus, the small images near the edge of the film in the display of FIG. 1 give a false appearance of accuracy when compared with the display of FIG. 3.

The terrain scan pattern illustrated in FIGS. 1 and 3, wherein each terrain scan is tangential to the preceding scan at the flight path 23, corresponds to one particular speed of the aircraft 10. If aircraft 10 changes its speed, while maintaining the same height and maintaining the same rate of scanning in the direction transverse to the flight path, the successive terrain scans produced will be closer together or farther apart than those shown in FIGS. 1 and 3. Nevertheless, the display system of the invention operates in the manner described, to avoid the production of multiple images from multiple detections of one target. The particular case of FIGS. 1 and 3 has been shown merely for its comparative clarity of illustration.

Figure 4:
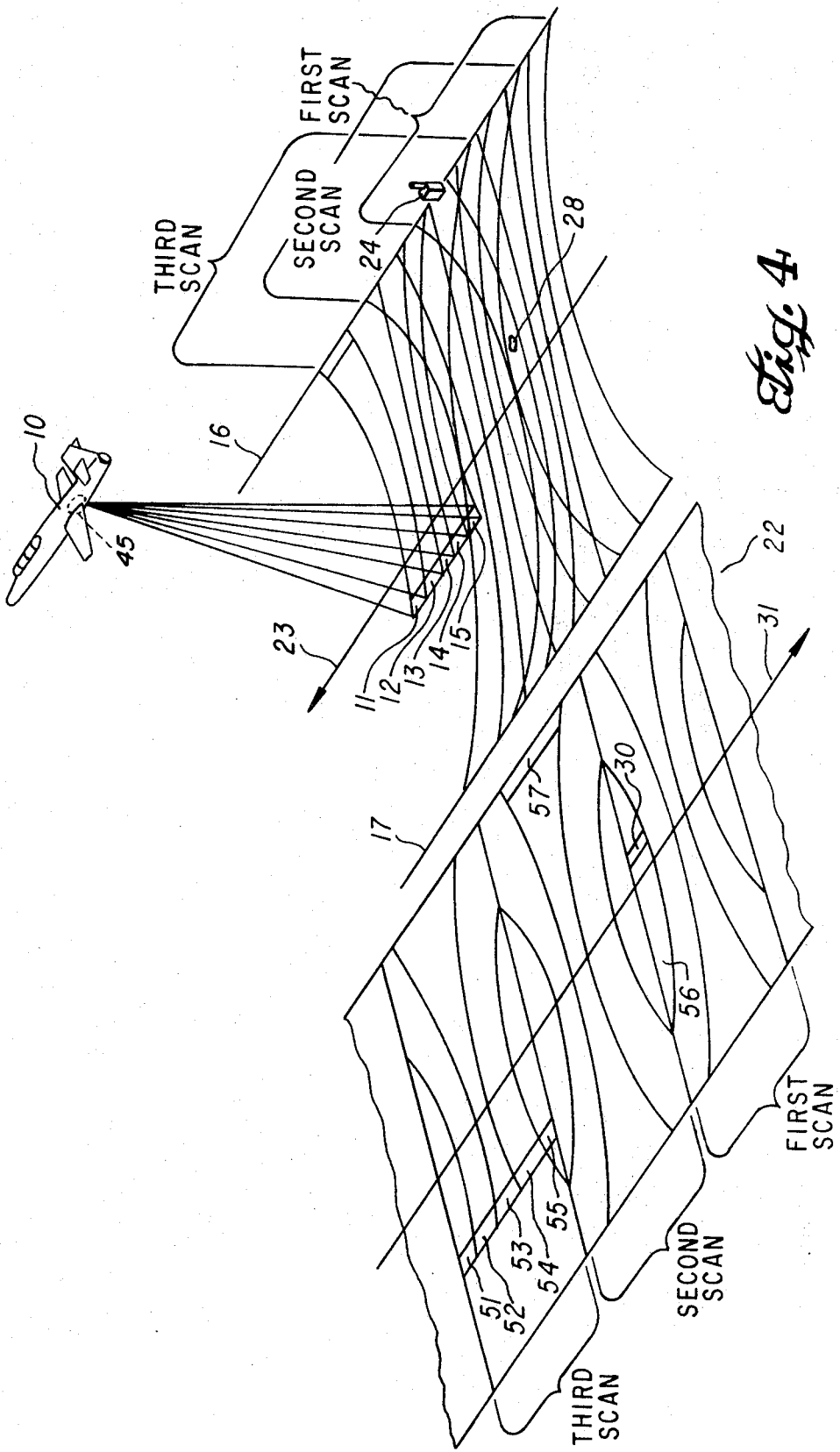
FIG. 4 illustrates the operation of a multiple detector infrared scanning system in accordance with a second embodiment of the invention.

FIG. 4 illustrates the film record obtained by using trace pattern 42, the second embodiment of the invention shown in FIG. 2, for the terrain scan pattern of FIG. 1. As can be seen from FIG. 2, pattern 42 is just like pattern 40, except that portions of the four outer display paths are missing. The operation of a system using pattern 42 is to print images in the same position as they would be printed in pattern 40, except that images which would be printed in the missing portion are not printed. Apparatus for producing this operation is discussed in connection with FIGS. 5 and 6.

On the first scan illustrated in FIG. 4, targets 24 and 28 are detected by the first detector, as previously described. However, the display space corresponding to the first detector is limited to a small sector 56, there being no film area which corresponds to the terrain sector for the first detector in which target 24 is located. Hence, there is no image of target 24 produced on the first scan. The image of target 28 falls within sector 56; hence it is printed as image 30. On the second scan, the third detector senses target 24 and an image 57 is printed. Target 28 is not detected on the second scan. On the third scan the fifth detector detects target 24, but again there is no display area corresponding to the terrain sector in which the fifth detector detects target 24; hence, no image is produced on the film record. There is also no image of target 28 produced by the third scan. Thus, there is printed only one image corresponding to each target, though the target be detected on successive scans.

The difference between the images produced by film trace pattern 40 of FIG. 2 and those produced by pattern 42 in the same figure is that the pattern 42 results in less overlap between the images produced by one scan and those produced by the preceding scan. Thus, for the particularly favorable airplane speed corresponding to the terrain scan pattern in FIGS. 1, 3 and 4, the film images corresponding to successive scans may be produced without any overlap. As seen in FIG. 3, the scan images produced by pattern 40 for the same speed display considerable overlap when printed out adjacent to one another at their narrowest point. It is to be emphasized that at lower plane speeds, both patterns 40 and 42 produce an overlap of succeeding scan patterns and that in such cases, pattern 42 causes successively detected images of the same target to be printed in superposition on the film, just as does pattern 40. Yet pattern 42 produces less overlapping, because of its shape. Clarity of target identification is enhanced by the decreased overlap, since the variation in the width of the images from the various detectors prevents perfect superposition.

From the illustrations of FIGS. 3 and 4, it is seen that in the reconnaissance system of the invention, there is provided means for sensing a condition, namely infrared radiation, along a terrain scan path. The width of the scan path is varying because of the FAR effect. Further provided are means for representing the sensed infrared radiation along a display path by exposing a film in accordance with the radiation detected. The exposure or display path on the film is made to have the shape of the terrain path to eliminate multiple images of one target. In the display of FIG. 4, only a portion of some terrain paths are represented by a display path.

Shown in FIGS. 5 and 6 is apparatus for correcting for FAR effect by the use of the patterns 40 and 42 of FIG. 2. FIG. 5 shows a masking device with openings 63, the shape of which determines whether pattern 40 or 42 is generated. Each of light modulators 60 in FIG. 5 is responsive to the output of one of the five infrared radiation detectors in the scanning array. The light from each modulator is collimated by a collimating lens 61. A cylindrical compensation mask 62 rotates about its cylindrical axis beneath the modulators 60. Compensation mask 62 is opaque except for openings 63 therein. FIG. 6 shows the shape of the openings 63 when compensation mask 62 is laid flat, the openings illustrated in FIG. 6 producing pattern 42. Each of the openings 63 is positioned on the mask 62 to receive light from one of the modulators 60. Beneath the rotating mask 62 and stationary with respect to modulators 60 is a fiber optics bundle 64. The bundle is composed of five fiber optics channels, as shown, each channel being wide at the end near modulators 60 and tapered to a small size at the other end. Each of the fiber optics channels is positioned to receive light coming through one of the openings 63. The light thus received is transmitted from the smaller end of the channel into a microscope objective 65.

Film 22, curved to conform to the cylindrical surface of mask 62, moves parallel to the cylindrical axis of the mask. Microscope objective 65, which is fixed with respect to mask 62, reduces in size the image received from fiber optics bundle 64 and casts the reduced image on film 22. As mask 62 rotates about the cylindrical axis thereof, the movement of microscope objective 65 across the film causes the image produced thereby likewise to sweep across the film in a direction transverse to the movement of the film. If the mask is that shown in FIG. 6, the resulting trace pattern on film 22 is pattern 42 of FIG. 2. The speed of rotation of mask 62 depends, of course, on the rate at which the five detector array scans between lines 16 and 17 in FIG. 1. The speed of film 22 is controlled by the velocity and height of the aircraft just as in FIG. 1.

Fiber optics bundle 64 has two major functions. First, the use of the bundle makes possible the use of a mask such as mask 62, wherein the openings 63 are spaced significantly far apart, to obtain a pattern, as pattern 42, where the images produced by openings 63 are adjacent. Second, the tapering of each optic channel in the bundle 64 causes the light to emanate from the small end thereof at a wide dispersion angle, assuring that microscope objective 65 may travel through a rather wide arc as it traverses film 22 while still receiving light from fiber optics bundle 64.

It is seen in FIG. 6 that the shape of the openings 63 is the same as that of the display paths in pattern 42. To produce the display pattern 40, the openings 63 are likewise constructed in the shape of the display paths in pattern 40. The shape of the display patterns should in turn conform to the shape of the terrain scan patterns.

If the apparatus of FIG. 5 is to produce a film record of frequently occurring successive scans, mask 62 may be equipped with more sets of openings in the shape of openings 63 disposed about the cylindrical axis of mask 62. Each set of openings would have corresponding microscope objective, located diametrically opposite therefrom as in the case of objective 65. Such an arrangement would provide multiple scans on each revolution of cylindrical mask 62 and would be particularly suited to producing the film record for those scanners which perform the terrain scan by means of a rotating, multisided mirror as in the above-cited U.S. Pat. No. 3,069,493.

It is to be understood that the above-described embodiments are merely illustrative of the application of the principles of the invention. Numerous other arrangements may be devised by those skilled in the art without departing from the spirit and scope of the invention as defined by the appended claims.

I claim:

1. A sensing method, comprising: sensing a condition along first and second scan paths during a first period and along third and fourth scan paths during a second period, said fourth path overlapping said first path, and representing the condition sensed on each of said scan paths along a display path wherein multiple images resulting from only a single condition along said scan paths, due to overlap from said varying widths of said scan paths, are eliminated.

2. The method of claim 1, wherein said step of sensing comprises detecting infrared radiation by scanning a surface with fixed resolution.

3. A sensor system comprising:

first means for sensing a condition along a first scan path during a first period and along a second scan path during a second period, wherein the width of said first and said second scan paths varies in a direction perpendicular to the direction of said path, second means for sensing a condition along a third scan path during said first period and along a fourth scan path during said second period, said fourth path overlapping said first path, wherein the width of said third and said fourth scan paths varies in a direction perpendicular to the direction of said path, third means responsive to said first and second means to represent the conditions sensed along each of said scan paths on a display path wherein multiple images resulting from only a single condition along said scan paths, due to overlap from said varying widths of said scan paths, are eliminated.

4. The sensor system of claim 3, wherein said first and second means are fixed resolution infrared detector means for scanning a surface.

5. A sensor system comprising:

means for sensing a condition along a path whose width varies in a direction perpendicular to the direction of said path, including a fixed resolution infrared detector means for scanning a surface, and means responsive to said means for sensing for representing the sensed condition along a display path in the shape of said path of varying width, said means for representing including a moving film, light modulator means responsive to said detector means to produce along a display path on said film a visible representation of the detected infrared radiation, and masking means interposed between said modulator means and said film to produce said display path in a shape which eliminates unwanted images detected by said sensing means.

6. A sensor system comprising:

first means for sensing a condition along a first scan path during a first period and along second scan path during a second period, second means for sensing a condition along a third scan path during said first period and along a fourth scan path during said second period, said fourth path overlapping said first path, said first and second means including fixed resolution infrared detector means for scanning a surface, third means responsive to said first and second means to represent the conditions sensed along each of said scan paths on a display path having the shape of the corresponding scan path, said third means including a moving film and light modulator means responsive to said first and second means to represent on said film the radiation detected along each scan path on a corresponding display path, said film having means associated therewith for orienting said display paths according to the orientation of said scan paths by moving said film with respect to said modulator means, and masking means between said light modulator means and said film for producing each of said display paths in the shape of the corresponding scan path.

7. An apparatus for causing plural light beams to scan paths having predetermined elongated shapes on a surface, comprising:

a mask having plural, spaced-apart openings, each opening being located in one of said light beams and each having one of said predetermined shapes, said masking having a motion relative to said beams in the direction of the elongation of said openings, plural, tapered fiber optic channels, fixed with respect to said beams, each channel receiving at the larger end thereof the light passing through one of said openings, and focusing means fixed with respect to said mask for directing the light emitted by the smaller end of said channels onto said surface.

* * * * *